(12) United States Patent
Tako et al.

(10) Patent No.: US 8,678,123 B2
(45) Date of Patent: Mar. 25, 2014

(54) ELECTRIC VEHICLE

(75) Inventors: Kenji Tako, Wako (JP); Koji Yaginuma, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/606,498

(22) Filed: Sep. 7, 2012

(65) Prior Publication Data
US 2013/0075177 A1    Mar. 28, 2013

(30) Foreign Application Priority Data

Sep. 27, 2011    (JP) .................................. 2011-211122

(51) Int. Cl.
*B62D 61/02*    (2006.01)
*B62K 11/02*    (2006.01)

(52) U.S. Cl.
USPC ........... 180/220; 180/214; 180/215; 180/216; 180/210; 180/2.1; 180/65.1

(58) Field of Classification Search
USPC .......... 180/220, 214, 215, 216, 210, 2.1, 65.1
See application file for complete search history.

(56) References Cited

U.S. PATENT DOCUMENTS

| | | | |
|---|---|---|---|
| 4,336,964 A * | 6/1982 | Pivar ............................ | 296/77.1 |
| 5,947,222 A * | 9/1999 | Yamaoka et al. ............. | 180/210 |
| 6,431,328 B1 * | 8/2002 | Tagami et al. ................. | 188/31 |
| 6,655,483 B2 * | 12/2003 | Hayashi ........................ | 180/65.1 |
| 2002/0027030 A1 * | 3/2002 | Tagami et al. ................ | 180/210 |
| 2008/0236914 A1 * | 10/2008 | Horii et al. .................... | 180/65.3 |
| 2010/0314184 A1 * | 12/2010 | Stenberg et al. ............. | 180/65.6 |
| 2012/0181765 A1 * | 7/2012 | Hill et al. ......................... | 280/62 |
| 2012/0247855 A1 * | 10/2012 | Mimura et al. ............... | 180/216 |
| 2012/0247856 A1 * | 10/2012 | Shinde et al. ................. | 180/216 |
| 2012/0259491 A1 * | 10/2012 | Kurakawa et al. .............. | 701/22 |
| 2013/0033070 A1 * | 2/2013 | Kinsman et al. ......... | 296/190.03 |

FOREIGN PATENT DOCUMENTS

| JP | 10-045080 A | | 2/1998 |
|---|---|---|---|
| JP | 2011-080329 | * | 3/2011 |

* cited by examiner

*Primary Examiner* — Tashiana Adams
*Assistant Examiner* — Marlon Arce
(74) *Attorney, Agent, or Firm* — Birch, Stewart, Kolasch & Birch, LLP (57) ABSTRACT

An electric vehicle wherein a seat post is provided as one of the components of a body frame for housing a battery. The body frame includes a main frame, a seat frame, a roof frame, and a shield support part. The main frame includes a battery case which is continuously integral with a rear portion of a head pipe wherein the battery is housed. The seat post is continuously integral with a rear portion of the battery case. The seat frame is configured to be connected to the upper end of the seat post for positioning a seat. The roof frame rises from the rear end of the seat frame and supports the rear end of a roof. The shield support part is provided on to project from a head pipe and, together with the windshield, supports a head lamp disposed on the front surface side of the windshield.

20 Claims, 6 Drawing Sheets

ELECTRIC VEHICLE

CROSS-REFERENCE TO RELATED APPLICATIONS

The present application claims priority under 35 USC 119 to Japanese Patent Application No. 2011-211122 filed Sep. 27, 2011 the entire contents of which are hereby incorporated by reference.

BACKGROUND OF THE INVENTION

1. Field of the Invention

The present invention relates to an improvement in an electric vehicle wherein a seat for a driver and a rear wheel or wheels disposed rearwardly of the seat are mounted to a rear portion of a body frame. A steering device for a front wheel is supported on a front portion of the body frame. Further, a windshield for covering the front side of the rider together with the steering device and a roof which extends rearwardly from an upper end portion of the windshield to cover the upper side of the driver are mounted on the body frame. An electric motor is provided for driving the rear wheel or wheels together with a battery for supplying the electric motor with electric power.

2. Description of Background Art

Such an electric vehicle as described above is known. See, for example, Japanese Patent Laid-open No. Hei 10-45080.

In a conventional electric vehicle as above-mentioned, a lower frame that is disposed in the longitudinal vehicle direction along a floor and a roof frame rise upwardly from the rear end of the lower frame so as to support the rear end of the roof are provided as components of the body frame. In addition, a seat is supported by a seat post rising upwardly from the lower frame forwardly of the roof frame. A battery chamber for housing a battery is formed beneath the seat. In such a configuration, in view of the formation of the battery chamber beneath the seat, the seat post is provided for exclusive use for supporting the seat. Thus, the seat post is not one of the components of the body frame. This complicates the structure of the vehicle, and hampers a reduction in the weight.

The present invention has been made in consideration of the above-mentioned circumstances. Accordingly, it is an object of an embodiment of the present invention to provide an electric vehicle that is simple in structure and light in weight, wherein a seat post is provided as one of the components of the body frame and the body frame can be utilized for housing a battery.

In order to attain the above object, according to an embodiment of the present invention, there is provided an electric vehicle includes a body frame wherein a steering device is supported on a front portion thereof a steering device for a front wheel. A seat for a driver is provided. A rear wheel or wheels are disposed rearwardly of the seat with the seat and the rear wheel or wheels being mounted to rear portions of the body frame. A windshield is provided for covering a front side of the driver together with the steering device. A roof extends rearwardly from an upper end portion of the windshield to cover an upper side of the driver. The windshield and the roof are also mounted to the body frame. An electric motor is provided for driving the rear wheel with a battery for supplying the electric motor with electric power. The body frame includes a main frame, a seat frame, a roof frame, and a shield support part. The main frame includes a head pipe supporting the steering device thereon, a battery case is integrally continuous with a rear portion of the head pipe for housing the battery. A seat post is integrally continuous with a rear portion of the battery case and rises upwardly. The seat frame is integrally connected to an upper end of the seat post and holds the seat. The roof frame rises upwardly from a rear end of the seat frame to support a rear end of the roof. The shield support part is provided on the head pipe to project forward and, together with the windshield, to support a head lamp disposed on a front surface side of the windshield. Footrests, protruding to the left and right outer sides of the battery case, are firmly attached to the battery case.

In addition, the electric vehicle according to an embodiment of the present invention includes the windshield that is integrally continuously provided with a leg shield that is connected at lower end portions thereof to the footrests to cover a front side of leg parts of the driver.

Further, the electric vehicle according to an embodiment of the present invention includes a backrest disposed on an upper side of the seat that is mounted to the roof frame.

Furthermore, the electric vehicle according to an embodiment of the present invention has a roof frame that includes two members composed of a roof post formed of a single pipe material which is connected to the seat frame and a roof support member composed of a casting which is connected to an upper end of the roof post. In this case, the roof support member is composed, in a loop form, of a lower edge portion which has an arcuate shape with both left and right ends thereof warped upwardly and to a central portion of which an upper end of the seat post is connected. An upper edge portion is provided which has an arcuate shape protuberant to the opposite side from the lower edge portion while interconnecting the left and right ends of the lower edge portion and to which a rear end portion of the roof is joined.

Furthermore, the electric vehicle according to an embodiment of the present invention has the shield support part that includes a stay projectingly provided on a front surface of the head pipe, a bracket integrally connected to a front end of the stay, and a cover member which clampingly supports the windshield between itself and the bracket. The head lamp and front turn signal lamps, disposed respectively on left and right sides of the head lamp, are mounted to the cover member.

According to an embodiment of the present invention, the body frame including the main frame, the seat frame, the roof frame and the shield support part constitutes a closed loop-formed firm structure in cooperation with the windshield and the roof, so that a firm and lightweight electric vehicle can be realized. More particularly, since the battery case in which the battery is housed and the seat post on which the seat frame is supported are provided at components of the main frame, this configuration contributes to simplification of structure and to reduce the weight of the electric vehicle. In addition, the structure in which the footrests protruding to the left and right outer sides of the battery case are secured to the battery case ensures that the footrests can be firmly supported by the highly rigid battery case.

According to an embodiment of the present invention, the leg shield is supported by the shield support part and the footrests, so that the support structure is made simple and firm.

According to an embodiment of the present invention, the backrest disposed on the upper side of the seat is mounted to the roof frame that supports the roof. Therefore, a support member for exclusive use for supporting the backrest is unnecessitated. This contributes to realization of an electric vehicle with a simplified structure and a reduced weight.

According to an embodiment of the present invention, the roof frame can be a simply configuration by use of two members, namely, the roof post which is formed of a single pipe material and connected to the seat frame and the roof support member which is composed of a casting and connected to the upper end of the roof post. Moreover, the roof support member is composed, in a loop form, of the lower edge portion which has an arcuate shape with both left and right ends thereof warped upwardly and to a central portion of which the upper end of the seat post is connected, and the upper edge portion which has an arcuate shape protuberant to the opposite side from the lower edge portion while interconnecting the left and right ends of the lower edge portion and to which a rear end portion of the roof is joined. Therefore, the loop-formed roof support member is very rigid. In addition, the roof joined to the upper edge portion has a centrally raised arcuate shape in cross section, in conformity with the shape of the upper edge portion, whereby enhanced rigidity and improved draining properties are ensured.

According an embodiment of the present invention, the cover member provided as a component of the shield support part serves also as a support member for the head lamp and the front turn signal lamps. This contributes to simplification of structure and enhancement of external appearance of the electric vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now, an embodiment of an electric three-wheeled vehicle based on the present invention will be described below, based on the accompanying drawings.

Figure 1:
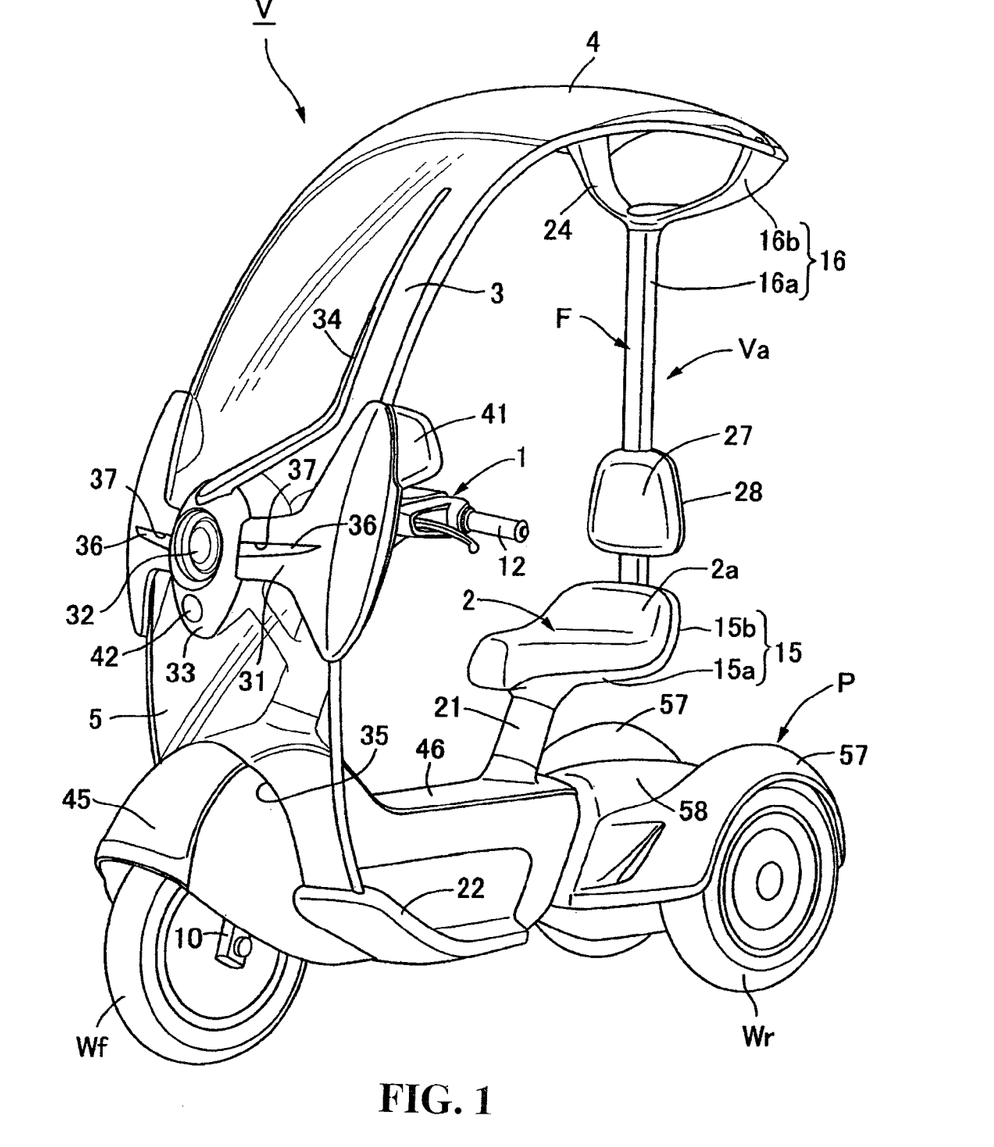
FIG. 1 is a perspective view, as viewed from a front side, of an electric three-wheeled vehicle according to an embodiment of the present invention.
Figure 2:
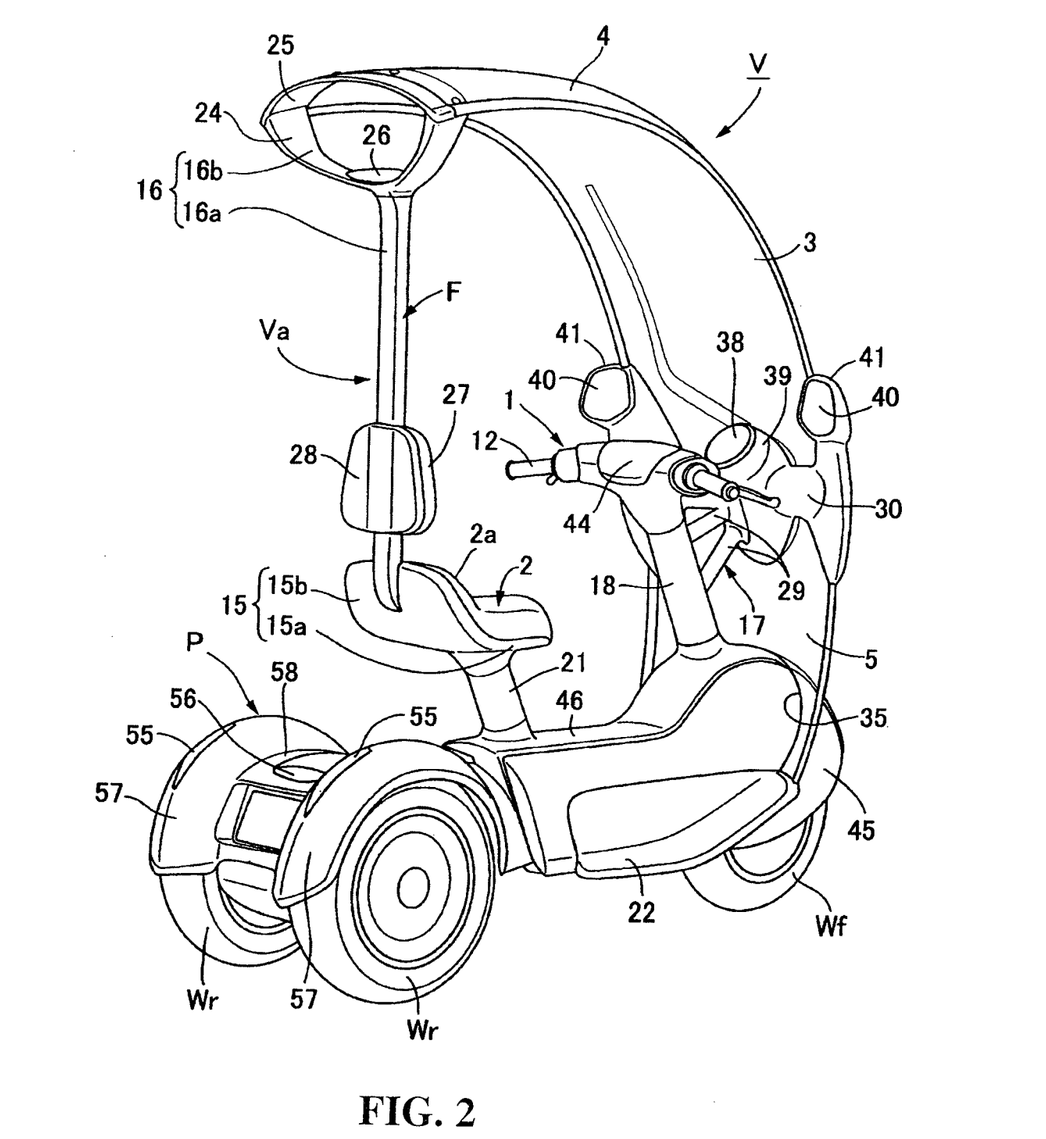
FIG. 2 is a perspective view, as viewed from a rear side, of the electric three-wheeled vehicle.
Figure 3:
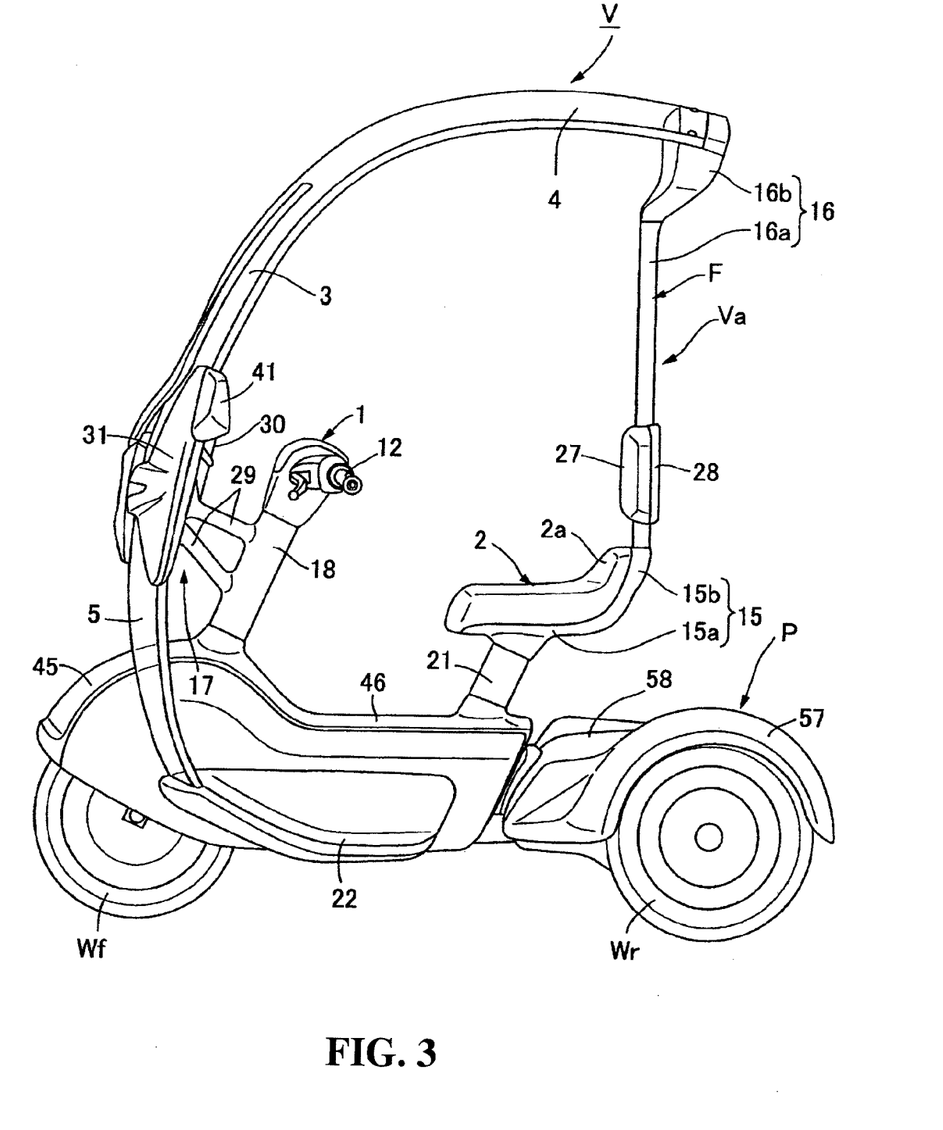
FIG. 3 is a side view of the electric three-wheeled vehicle.

As illustrated in FIGS. 1 to 3, an electric three-wheeled vehicle V includes a steering device 1 supporting a single front wheel Wf with a body frame F supporting the steering device 1. A seat 2 is provided for a driver which is supported on the body frame F. A windshield 3 is provided for covering the front side of the driver together with the steering device 1. A roof 4 is provided continuously integrally with an upper end portion of the windshield 3 that extends rearwardly and covers the upper side of the driver. A leg shield 5 is provided continuously integrally with a lower end portion of the windshield 3 that extends downwardly and covers the front side of the leg parts of the driver. A power unit P supports a pair of left and right rear wheels Wr, Wr, and drives the wheels by an electric motor 6. The windshield 3, the roof 4 and the leg shield 5 are integrally formed of a single sheet of acrylic resin plate.

The steering device 1 includes a front fork 10 on which the front wheel Wf is rotatably supported, a steering stem 11 protruding upwardly beyond the upper end of the front fork 10 and a bar-shaped steering handle 12 attached to the upper end of the steering stem 11.

Figure 6:
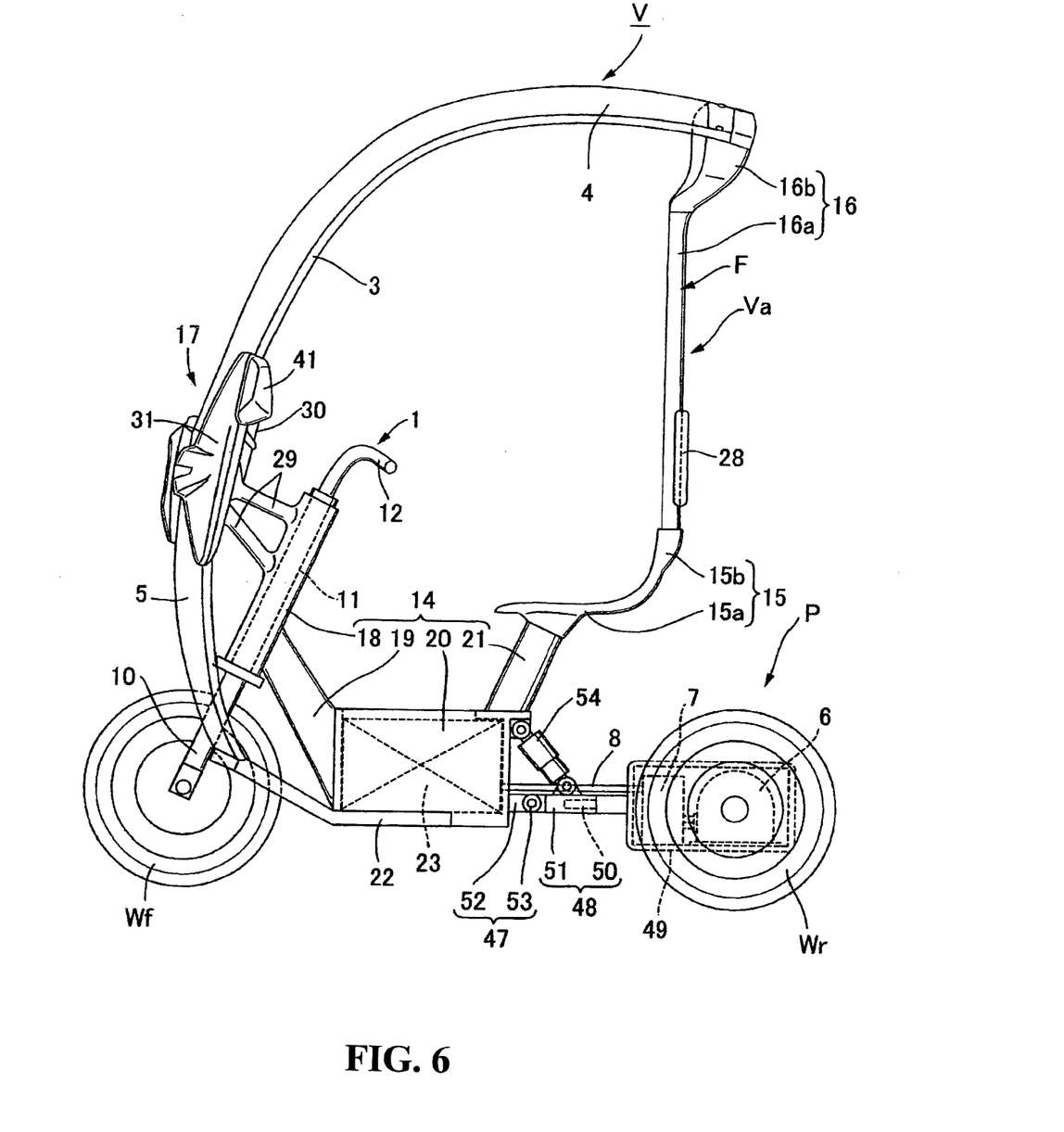
FIG. 6 is a side view of the electric three-wheeled vehicle, with covers removed.

As shown in FIG. 6, the body frame F includes a main frame 14, a seat frame 15, a roof frame 16, and a shield support part 17. The main frame 14 includes a head pipe 18 steerably supporting the steering stem 11, a down tube 19 extending rearwardly downwardly from the head pipe 18, an upwardly opening type battery case 20 integrally connected to the lower end of the down tube 19, and a seat post 21 integrally continuous with a rear portion of the battery case 20 and rising upwardly. A battery 23 for supplying the electric motor 6 with electric power is housed in the battery case 20.

In addition, a pair of left and right footrests 22, 22 protruding to the outer sides than left and right side surfaces of the battery case 20 are firmly attached to the battery case 20.

In FIGS. 1, 2 and 6, the seat frame 15 includes a bottom plate portion 15a integrally connected to the upper end of the seat post 21, and a rising wall portion 15b rising upwardly from the rear end of the bottom plate portion 15a; by these portions, the seat 2 having a hip rest 2a is supported.

Figure 5:
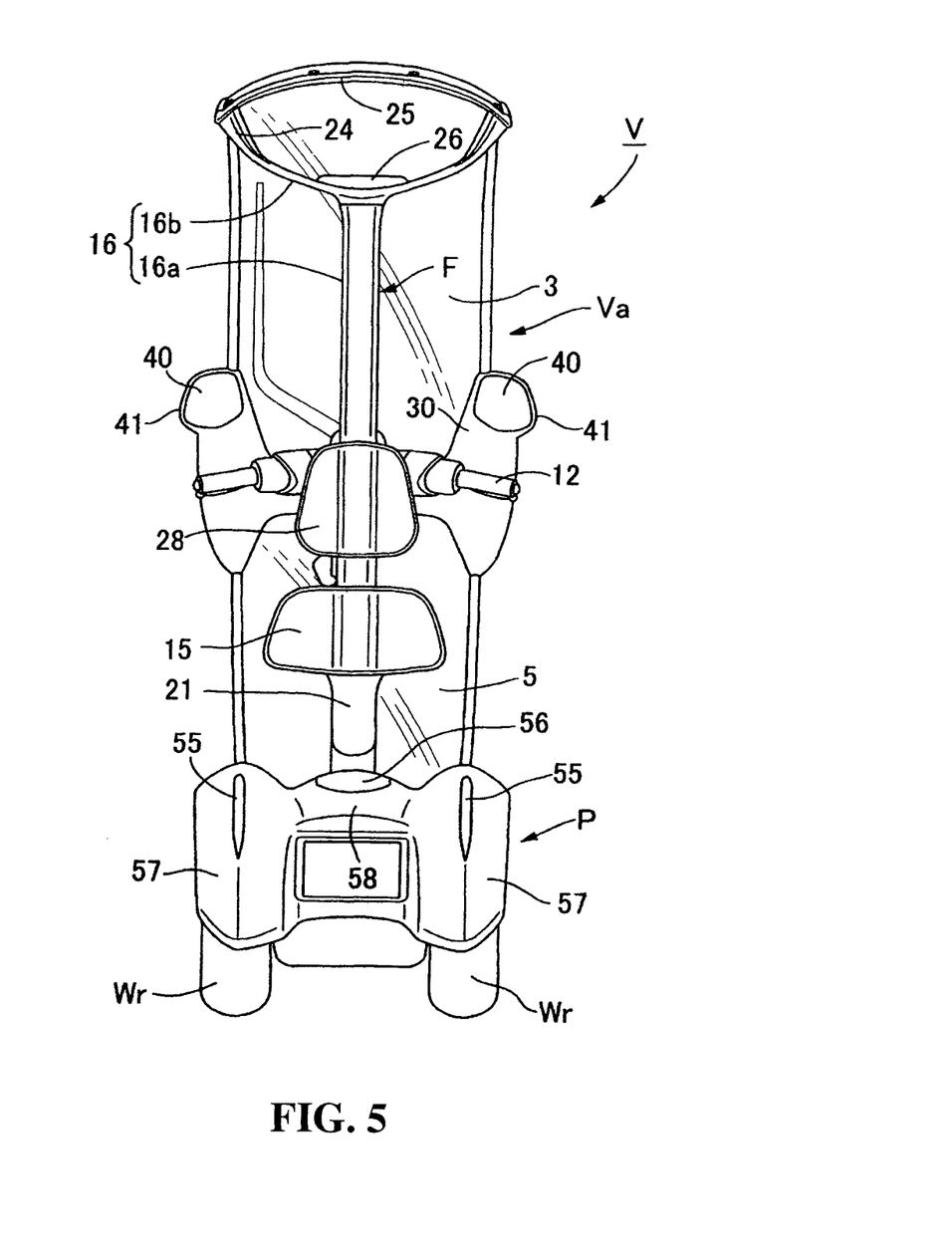
FIG. 5 is a rear view of the electric three-wheeled vehicle.

As shown in FIGS. 2 and 5, the roof frame 16 is composed of two members, namely, a roof post 16a formed of a single rectangular (polygonal) or circular pipe material, connected to the rising wall portion 15b of the seat frame 15 and extending upward, and a roof support member 16b that is composed of an aluminum die casting and connected to the upper end of the roof post 16a. The roof support member 16b is composed, in a vertically flattened loop-like general form, of a lower edge portion 24 which has an arcuate shape with both left and right ends thereof warped upward, and an upper edge portion 25 that has an arcuate shape protuberant to the opposite side from the lower edge portion 24 and interconnects the left and right ends of the lower edge portion 24. To a central portion of the lower edge portion 24, the upper end of the seat post 21 is connected by welding, caulking or the like. Onto a central portion of the upper edge portion 25, a rear end portion of the roof 4 is lapped and screwed. A stop lamp 26 functioning also as a tail lamp is mounted to the lower edge portion 24.

In addition, a back plate 28 supporting a backrest 27 immediately over the hip rest 2a is attached to the roof post 16a.

The shield support part 17 includes a plurality of stays 29, 29 provided to project on a front surface of the head pipe 18 with a bracket 30 integrally connected to the front ends of the stays 29, 29 and spreading leftward and rightward. A cover member 31 supports, in a clamping manner, the windshield 3 between itself and the bracket 30.

Figure 4:
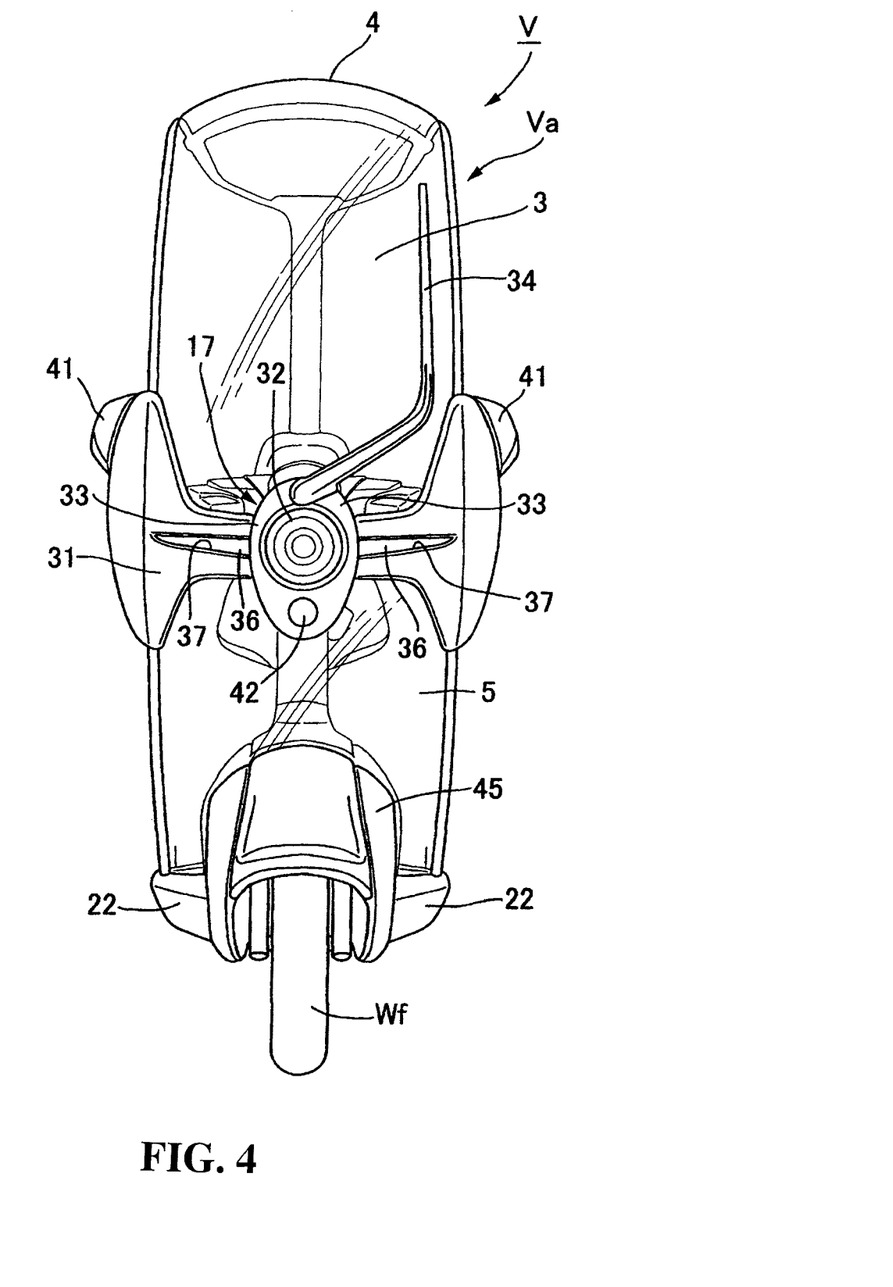
FIG. 4 is a front view of the electric three-wheeled vehicle.

As shown in FIG. 4, a lamp case 33 for holding a head lamp 32 is formed integrally with a central portion of the cover member 31. Thus, the shield support part 17 supports the head lamp 32 together with the windshield 3. A wiper 34 for wiping the front surface of the windshield 3 is mounted to an upper portion of the lamp case 33.

As illustrated in FIGS. 1 and 2, the leg shield 5 is provided continuously integrally with the windshield 3 for covering the front side of the driver's leg parts. The leg shield 5 is connected at its lower end portion to front end portions of the left and right footrests 22, 22. In this case, the leg shield 5 is provided, in a lower-end central portion thereof, with an arcuate cutout 35 for receiving a front fender 45.

On the other hand, as shown in FIGS. 1 and 4, the cover member 31 is formed with a pair of turn signal lamp mounting recesses 37, 37 that extend long to outer sides from left and right side surfaces of the lamp case 33 and into which front turn signal lamps 36, 36 are mounted. The bracket 30 and the cover member 31 are coupled to each other by screws (not shown) penetrating the turn signal lamp mounting recesses 37, 37 and the windshield 3. After the coupling, therefore, the front turn signal lamps 36, 36 mounted into the turn signal lamp mounting recesses 37, 37 hide the screws, thereby giving a better external appearance. Furthermore, a horn 42 is mounted to the cover member 31 at a position immediately under the lamp case 33.

As shown in FIG. 2, the bracket 30 is integrally formed, at its central portion, with a meter housing 39 in which to house a meter 38 incorporating a speedometer and the like. In addition, the bracket 30 is integrally formed, at its left and right end portions, with a pair of mirror holders 41, 41 for holding rearview mirrors 40, 40 so that the angles of the rearview mirrors 40, 40 can be adjusted. The mirror holders 41, 41 are so formed as to protrude beyond left and right side edges of the windshield 3.

To the steering handle 12, a handle cover 43 is mounted which covers the steering handle 12, exclusively of left and right grips. At a central portion of the handle cover 43, a small thing container 44 with a lid is formed.

As shown in FIGS. 1 and 2, a body cover 46 for covering the battery case 20 is mounted to the body frame F, in integral continuity with the front fender 45 which covers the upper side and both lateral sides of the front wheel Wf.

In FIG. 6, the power unit P is so configured that the left and right rear wheels Wr, Wr are supported on a unit case 49 connected to a rear end portion of the main frame 14 through a pivot joint 47 and a rolling joint 48, and that the electric motor 6 for driving the rear wheels Wr, Wr and a driving device (including a PDU, a charging circuit, etc.) 7 for controlling the energization of the electric motor 6 are housed and held in the unit case 49. The driving device 7 is connected to the battery 23 through a flexible high-voltage cable 8.

The rolling joint 48 includes a joint shaft 50 secured to the front end of the unit case 49 and extending forward, and a joint case 51 fitted and connected to the joint shaft 50 in a relatively rotatable manner. On the other hand, the pivot joint 47 includes a joint arm 52 provided to project on a rear end surface of the battery case 20, and a pivot shaft 53 that is disposed to be horizontal in the left-right direction and by which a front end portion of the joint case 51 is connected to the joint arm 52 in a vertically swingable fashion. A shock absorber 54 is interposed between the battery case 20 and the joint case 51.

A rear cover 58 for covering the upper surface of the unit case 49 is mounted to the unit case 49. Rear fenders 57, 57 covering the upper side of the left and right rear wheels Wr, Wr are provided to be continuously integral with left and right end portions of the rear cover 58. To the left and right rear fenders 57, 57, rear turn signal lamps 55, 55 are mounted that are each elongated over the range from an upper surface to a rear surface of the rear fender 57. In addition, a stop lamp 56 that functions also as a tail lamp is mounted to a central portion of the rear cover 58.

In this electric three-wheeled vehicle V, the portion forwardly of the rolling joint 48 will be referred to as a vehicle main body Va.

When the electric three-wheeled vehicle V is traveling on a curved road, rolling (namely, leftward and rightward tilting) of the vehicle main body Va relative to the power unit P is enabled through relative rotation of the joint shaft 50 and the joint case 51 of the rolling joint 48. In addition, at the time of traveling on a rough road, vertical oscillations are generated in the vehicle main body Va or the power unit P, with the pivot shaft 53 as a fulcrum, and the oscillations are damped by the shock absorber 54.

In addition, as above-mentioned, the body frame F of the vehicle main body Va is composed of the main frame 14 including the head pipe 18, the down tube 19, the battery case 20 and the seat post 21 and the seat frame 15 integrally connected to the upper end of the seat post 21. Further, the roof frame 16 rises upwardly from the rear end of the seat frame 15 with the shield support part 17 forwardly projectingly formed on the head pipe 18. In addition, the windshield 3 and the roof 4 are continuously integral to each other and are supported by the shield support part 17 and the roof frame 16. Therefore, the body frame F constitutes a closed loop-formed rigid structure in cooperation with the windshield 3 and the roof 4. Accordingly, a rigid and lightweight vehicle main body Va can be realized.

More specifically, the battery case 20 housing the battery 23 therein and the seat post 21 supporting the seat frame 15 thereon are components of the main frame 14, which greatly contributes to simplification of structure and lightening of the weight of the vehicle main body Va. In addition, the structure in which the footrests 22, 22 protruding to the left and right outer sides of the battery case 20 are firmly attached to the battery case 20 to ensure that the footrests 22, 22 can be firmly supported by the highly rigid battery case 20.

In addition, since the leg shield 5, connected to the footrests 22, 22 at its lower end portions, is continuously integral with the windshield 3, the leg shield 5 is supported by the shield support part 17 and the footrests 22, 22. Consequently, the support structure is made simple and firm.

Further, since the backrest 27, disposed on the upper side of the seat 2, is mounted to the roof frame 16 supporting the roof 4, a support member for exclusive use for supporting the backrest 27 is not necessary. This contributes to a simplification of structure and lightening of the weight of the vehicle main body Va.

Furthermore, since the roof frame 16 is composed of two members, namely, the roof post 16a that is formed of a single pipe material and connected to the seat frame 15 and the die-cast roof support member 16b that is connected to the upper end of the roof post 16a, the roof frame 16 can be simply configured by use of the two members. Moreover, the roof support member 16b is composed, in a loop form, of the lower edge portion 24 that has an arcuate shape with both left and right ends thereof warped upwardly and the upper edge portion 25 that has an arcuate shape protuberant to the opposite side from the lower edge portion 24 and interconnects the left and right ends of the lower edge portion 25. Therefore, the loop-formed roof support member 16b is high in rigidity. In addition, the roof 4 joined to the upper edge portion 25 has a centrally raised arcuate shape in cross section, in conformity with the shape of the upper edge portion 16b. Consequently, enhanced rigidity and improved draining properties are secured.

Furthermore, the shield support part 17 includes the stays 29, 29 provided to project on the front surface of the head pipe 18, the bracket 30 integrally connected to the front ends of the stays 29, 29, and the cover member 31 that supports in a clamping manner the windshield 3 between itself and the bracket 30. In addition, the head lamp 32 and the front turn signal lamps 36, 36, disposed on the left and right sides of the head lamp 32, are mounted to the cover member 31. Therefore, the cover member 31, provided as one of the components of the shield support part 17, serves also as a support member for the head lamp 32 and the front turn signal lamps 36, 36, that can contribute to a simplification of the structure and an improvement in the external appearance of the vehicle main body Va.

While an embodiment of the present invention has been described above, the invention is not limited to the above embodiment, and various design modifications are possible within the scope of the gist of the invention. For instance, the steering handle 12 may be configured to have a looped shape. In addition, the present invention is applicable also to a roofed electric two-wheeled vehicle. Further, the loop-formed roof support member 16b may be injection molded from synthetic resin. Furthermore, the electric motor 6 may be a single electric motor of which the driving force is distributed to the left and right rear wheels Wr, Wr, or may be two electric motors by which the left and right rear wheels Wr, Wr are driven individually.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric vehicle comprising:
a body frame supporting on a front portion thereof a steering device for a front wheel;
a seat for a driver;
a rear wheel disposed rearwardly of the seat, the seat and the rear wheel being mounted to rear portions of the body frame;
a windshield covering a front side of the driver together with the steering device;
a roof extending rearwardly from an upper end portion of the windshield to cover an upper side of the driver, the windshield and the roof being mounted to the body frame;
an electric motor for driving the rear wheel;
a battery for supplying the electric motor with electric power;
wherein the body frame includes a main frame, a seat frame, a roof frame, and a shield support part wherein the main frame includes a head pipe supporting the steering device thereon;
a battery case is continuously integral with a rear portion of the head pipe for housing the battery;
a seat post is continuously integral with a rear portion of the battery case and rises upwardly with the seat frame being integrally connected to an upper end of the seat post for positioning the seat;
the roof frame rises upwardly from a rear end of the seat frame to support a rear end of the roof;
said shield support part being provided on the head pipe to project forward and, together with the windshield, to support a head lamp disposed on a front surface side of the windshield; and
footrests protruding to left and right outer sides of the battery case are firmly attached to the battery case,
wherein the roof frame includes two members of a roof post formed of a single pipe material connected to the seat frame and a roof support member composed of a casting connected to an upper end of the roof post, the roof support member being composed, in a loop form, of a lower edge portion with an arcuate shape with both left and right ends thereof warped upwardly and to a central portion of which an upper end of the seat post is connected, and an upper edge portion has an arcuate shape protuberant to the opposite side from the lower edge portion while interconnecting the left and right ends of the lower edge portion and to which a rear end portion of the roof is joined.

2. The electric vehicle according to claim 1, wherein the windshield is continuously integrally provided with a leg shield connected at lower end portions thereof to the footrests to cover a front side of leg parts of the driver.

3. The electric vehicle according to claim 1, wherein a backrest disposed on an upper side of the seat is mounted to the roof frame.

4. The electric vehicle according to claim 1, wherein a down tube extends rearwardly and downwardly from the head pipe and the battery case is upwardly opened and integrally connected to a lower end of the down tube.

5. The electric vehicle according to claim 1, wherein the electric motor and the rear wheel are supported on a unit case operatively connected to a rear end portion of the main frame through a pivot joint and a rolling joint.

6. The electric vehicle according to claim 5, wherein the rolling joint includes a joint shaft secured to a front end of the unit case and extending forward and a joint case rotatably fitted and connected to the joint shaft.

7. The electric vehicle according to claim 5, wherein the pivot joint includes a joint arm provided to project from a rear end surface of the battery case and a pivot shaft disposed to be horizontal in a left-right direction wherein a front end portion of a joint case is connected to a joint arm to be vertically swingable.

8. The electric vehicle according to claim 5, and further including a shock absorber operatively mounted between the battery case and the unit case for absorbing shocks during operation of the electric vehicle.

9. An electric vehicle comprising:
a body frame supporting on a front portion thereof a steering device for a front wheel;
a seat for a driver;
a rear wheel disposed rearwardly of the seat, the seat and the rear wheel being mounted to rear portions of the body frame;
a windshield covering a front side of the driver together with the steering device;
a roof extending rearwardly from an upper end portion of the windshield to cover an upper side of the driver, the windshield and the roof being mounted to the body frame;
an electric motor for driving the rear wheel;
a battery for supplying the electric motor with electric power;
wherein the body frame includes a main frame, a seat frame, a roof frame, and a shield support part wherein the main frame includes a head pipe supporting the steering device thereon;
a battery case is continuously integral with a rear portion of the head pipe for housing the battery;
a seat post is continuously integral with a rear portion of the battery case and rises upwardly with the seat frame being integrally connected to an upper end of the seat post for positioning the seat;
the roof frame rises upwardly from a rear end of the seat frame to support a rear end of the roof;
said shield support part being provided on the head pipe to project forward and, together with the windshield, to support a head lamp disposed on a front surface side of the windshield; and
footrests protruding to left and right outer sides of the battery case are firmly attached to the battery case, wherein the shield support part includes a stay provided to project on a front surface of the head pipe, a bracket integrally connected to a front end of the stay, and a cover member for clamping the windshield between itself and the bracket and the head lamp and front turn signal lamps disposed respectively on left and right sides of the head lamp are mounted to the cover member.

10. The electric vehicle according to claim 9, wherein the roof frame includes two members of a roof post formed of a single pipe material connected to the seat frame and a roof support member composed of a casting connected to an upper end of the roof post, the roof support member being composed, in a loop form, of a lower edge portion with an arcuate shape with both left and right ends thereof warped upwardly and to a central portion of which an upper end of the seat post is connected, and an upper edge portion has an arcuate shape protuberant to the opposite side from the lower edge portion while interconnecting the left and right ends of the lower edge portion and to which a rear end portion of the roof is joined.

11. The electric vehicle according to claim 9, wherein the electric motor and the rear wheel are supported on a unit case operatively connected to a rear end portion of the main frame through a pivot joint and a rolling joint.

12. An electric vehicle comprising:
a body frame;
a seat for a driver;
a roof extending rearwardly from an upper end portion of a windshield to cover an upper side of the driver, the windshield and the roof being mounted to the body frame;
an electric motor for driving a rear wheel;
a battery for supplying the electric motor with electric power;
said body frame comprising:
a main frame;
a seat frame;
a roof frame; and
a shield support part;
said the main frame including a head pipe supporting a steering device thereon;
a battery case is continuously integral with a rear portion of the head pipe for housing the battery; and
a seat post is continuously integral with a rear portion of the battery case and rises upwardly with the seat frame being integrally connected to an upper end of the seat post for positioning the seat;
the roof frame rises upwardly from a rear end of the seat frame to support a rear end of the roof;
said shield support part being connected to the head pipe to project forwardly therefrom,
wherein the electric motor and the rear wheel are supported on a unit case operatively connected to a rear end portion of the main frame through a pivot joint and a rolling joint.

13. The electric vehicle according to claim 12, wherein the windshield is continuously integrally provided with a leg shield connected at lower end portions thereof to footrests to cover a front side of leg parts of the driver.

14. The electric vehicle according to claim 12, wherein a backrest disposed on an upper side of the seat is mounted to the roof frame.

15. The electric vehicle according to claim 12, wherein the roof frame includes two members of a roof post formed of a single pipe material connected to the seat frame and a roof support member composed of a casting connected to an upper end of the roof post, the roof support member being composed, in a loop form, of a lower edge portion with an arcuate shape with both left and right ends thereof warped upwardly and to a central portion of which an upper end of the seat post is connected, and an upper edge portion has an arcuate shape protuberant to the opposite side from the lower edge portion while interconnecting the left and right ends of the lower edge portion and to which a rear end portion of the roof is joined.

16. The electric vehicle according to claim 12, wherein the shield support part includes a stay provided to project on a front surface of the head pipe, a bracket integrally connected to a front end of the stay, and a cover member for clamping the windshield between itself and the bracket and a head lamp and front turn signal lamps disposed respectively on left and right sides of the head lamp are mounted to the cover member.

17. The electric vehicle according to claim 12, wherein a down tube extends rearwardly and downwardly from the head pipe and the battery case is upwardly opened and integrally connected to a lower end of the down tube.

18. The electric vehicle according to claim 12, wherein the rolling joint includes a joint shaft secured to a front end of the unit case and extending forward and a joint case rotatably fitted and connected to the joint shaft.

19. The electric vehicle according to claim 12, wherein the pivot joint includes a joint arm provided to project from a rear end surface of the battery case and a pivot shaft disposed to be horizontal in a left-right direction wherein a front end portion of a joint case is connected to a joint arm to be vertically swingable.

20. The electric vehicle according to claim 12, and further including a shock absorber operatively mounted between the battery case and the unit case for absorbing shocks during operation of the electric vehicle.

* * * * *